United States Patent [19]
Penisson

[11] 3,932,365
[45] Jan. 13, 1976

[54] PREPARATION OF HIGH MOLECULAR WEIGHT POLYMER FROM OXALIC ACID AND PARA-PHENYLENE DIISOCYANATE

[75] Inventor: Rene Penisson, Lyon, France
[73] Assignee: Rhone-Poulenc-Textile, Paris, France
[22] Filed: Aug. 7, 1973
[21] Appl. No.: 386,315

[30] Foreign Application Priority Data
Aug. 9, 1972    France .............................. 72.29010
May 28, 1973   France .............................. 73.19614

[52] U.S. Cl. .............. 260/78 R; 260/78 S; 264/184
[51] Int. Cl.² ......................................... C08G 18/76
[58] Field of Search ................................. 260/78 R

[56] References Cited
UNITED STATES PATENTS
| | | | |
|---|---|---|---|
| 3,329,653 | 7/1967 | Beavers et al. | 260/78 R |
| 3,738,964 | 6/1973 | Dobinson et al. | 260/78 R |
| 3,770,704 | 11/1973 | Dobinson | 260/78 R |

OTHER PUBLICATIONS
Chemical Abstracts, Vol. 59, July, 1963, 1762d.

*Primary Examiner*—Harold D. Anderson
*Attorney, Agent, or Firm*—Cushman, Darby & Cushman

[57] ABSTRACT

A process for preparing high molecular weight aryl alkyl polymers is disclosed, wherein oxalic acid and paraphenylene diisocyanate are reacted in substantially stoichiometric amounts in a polar, aprotic anhydrous organic solvent at a temperature which is raised progressively at a rate of about 1 to about 5°C per minute from a lower temperature of about 0° to 30°C to a higher temperature of about 80° to about 150°C in the presence of, at least when the viscosity of the reaction mixture exceeds 6,000 poises, a viscosity reducing amount of a hydrogen bond breaking agent, such as lithium chloride.

The resulting polymers can be formed into filaments, fibers and films, and the filaments exhibit improved tensile strengths and modulus of elasticity as compared to similar filaments of other arylalkyl polymers based on oxalic acid and other aromatic diisocyanates.

11 Claims, No Drawings

PREPARATION OF HIGH MOLECULAR WEIGHT POLYMER FROM OXALIC ACID AND PARA-PHENYLENE DIISOCYANATE

BACKGROUND OF THE INVENTION

The present invention relates to high molecular weight film- and fiber-forming nitrogen - containing arylalkyl polymers, and to the process for producing same by reacting oxalic acid and paraphenylene diisocyanate.

Filaments and fibers formed of aromatic polyamides, or aryl-aliphatic polyamides, are known to the art. For instance, the Stephens U.S. Pat. No. 3,418,275 discloses the production of polymers by reacting disubstituted aromatic diamines, such as N,N'-diphenyl-p-phenylene diamine, with acid halides of dicarboxylic acids, such as oxalylchloride. The article by L. B. Sokolo and L. V. Turetsku, Vysokomol. Soed. 4, 1817–21 (1962) describes the production of a polymer of paraphenylene diamine and oxaylchloride by a gas-liquid interfacial polycondensation reaction.

The Gilman U.S. Pat. No. 2,268,586 describes the process of preparing polyamides by reacting diacids and diisocyanates. Diacids include oxalic acid, as well as various aromatic diacids, and suitable diisocyanates are aliphatic-aromatic diisocyanates, and aliphatic diisocyanates.

The Allard U.S. Pat. No. 3,642,715 describes a process for preparing aromatic or aryl aliphatic polyamides by reacting, in a solvent medium, an aromatic diisocyanate and an aromatic or aliphatic diacid having at least three carbon atoms.

SUMMARY OF THE INVENTION

The present invention relates to a process for preparing high molecular weight film- and fiber- forming nitrogen - containing polymers by reacting oxalic acid and paraphenylene diisocyanate, and to the resulting polymers.

This particular polymer, when produced by the process of the present invention, has properties which are greatly improved over similar polymers produced by reacting oxalic acid and other aromatic diisocyanates.

The process for producing the arylalkyl polymers in question involves reacting substantially stoichiometric amounts of oxalic acid and paraphenylene diisocyanate in a polar, aprotic, anhydrous organic solvent at a temperature which is progressively raised. A hydrogen bond breaking agent is added at the time the viscosity of the reaction mixture exceeds 6,000 poises.

DETAILED DESCRIPTION OF THE INVENTION

The present invention is directed to arylalkyl polymers produced by reacting substantially stoichiometric amounts of paraphenylene diisocyanate and oxalic acid in the presence of an organic, polar, aprotic, anhydrous solvent, and to the process for producing same. Filaments, fibers and films exhibiting good mechanical properties and favorable moduli of elasticity may be formed by wet or dry spinning or filming a solution of the polymer.

The paraphenylene diisocyanate and the oxalic acid are reacted at a temperature which is raised progressively from a lower temperature, which is about 0° to about 30°C, to a higher temperature of about 80°C to about 150°C. The temperature is raised progressively over the above interval at a rate of about 1° to about 5°C per minute.

A hydrogen bond breaking agent, such as lithium chloride and calcium chloride, is present at least during the time the viscosity of the reaction mixture is above 6,000 poises. The polymeric solution obtained by the polymerization reaction can be wet or dry spun or filmed to form shaped articles.

The filaments and fibers produced from the aryl alkyl polymers produced by the process of the present invention have improved mechanical characteristics, in relation to filaments and fibers obtained from other aryl aliphatic polymers, and specifically have a modulus of elasticity greater than 2,000 g/tex and good thermal characteristics.

The polymers produced by the process of the present invention have an inherent viscosity higher than 0.5. The solution viscosity of the polymer, at a concentration of 10 – 50%, is generally in the range of 1,000 to 6,000 poises. Furthermore, the thermal characteristics of the polymers produced by the present invention are improved.

The oxalic acid and the paraphenylene diisocyanate are brought into contact at a temperature between 0° and 30°C, preferably at atmospheric pressure. The temperature is progressively raised over the course of the reaction, at a speed of 1° to 5°C per minute, preferably between 1° and 2°C per minute, up to a maximum of about 150°C. Before the viscosity of the reaction mixture is too great, a hydrogen bond breaking agent, such as lithium or calcium chloride, is added.

"Substantially stoichiometric amount" in the present specification refers to molar ratios of oxalic acid/diisocyanate of about 1, and generally between 0.90 and 1.20. As the solvent medium, a polar, aprotic, anhydrous, organic solvent, such as linear or cyclic amides or phosphoramides, such as, for instance, N,N-dimethylacetamide, N-methylpyrrolidone, hexamethylphosphoryl triamide, or mixtures thereof, or sulfones, such as, for instance, tetramethylenesulfone, may be used. The solvent medium may contain certain proportions of hydrocarbon polymer solvents, which are inert toward the reactants under the reaction conditions, such as xylene or toluene or the like.

It is essential that a hydrogen bond breaking agent be present in the polymerizing mixture at least at the time that the mixture has a viscosity greater than 6,000 poises. The hydrogen bond breaking agents are known agents. Lithium chloride and calcium chloride are especially preferred, but other hydrogen bond breaking agents may be used if desired. The amount of the hydrogen bond breaking agent will be at least sufficient to reduce the polymerization mixture viscosity to a level below 6000 poises. Preferably, the hydrogen bond breaking agent will be used in an amount of 18 to 25% by weight, based on the weight of the polymer obtained at the end of the polymerization reaction. The hydrogen bond breaking agents may be introduced either at the beginning of the reaction, or preferably during the course of the reaction.

The mixing of the reagents is preferably accomplished at ambient temperature, or a temperature relatively close to ambient temperature. The two reagents may be simultaneously or successively dissolved in the polymerization solvent, or may be dissolved separately in two different portions of the polymerization solvents, and the two responsive solutions can then be mixed. The total concentration of the reagents in the initial solution is generally between 10 and 50% by weight, preferably between 15 and 35% by weight (that is, expressed in terms of ultimate polymer weight per 100 g of solution). The reagents and the solvents are generally introduced in a reactor provided with a stirring device, a sheath for a thermometer, a reflux cooler and a dry nitrogen inlet.

The mixture of the polymerization components is maintained for several minutes to 1 hour under agitation at room temperature, during which time interval a strong discharge of $CO_2$ and CO will be noted, and the temperature will generally rise to 40° – 45°C. Thereafter, the temperature is raised at a regulated rate to between 80°C and 120°C. Within this range, the reaction mixture generally becomes quite viscous and almost pasty, and the hydrogen bond breaking agent, such as the lithium chloride or calcium chloride, is preferably added at this time to decrease the solution viscosity. This reduction of solution viscosity allows the polymerization reaction to be continued with the temperature being raised to 140° – 150°C.

During the reaction, the rate of temperature rise is preferably in the order of 1°C per minute. Normally, the duration of the temperature rise will be between 2 and 5 hours. To obtain a high degree of polymerization, it is generally preferred to then finish the process with heating at a constant temperature, corresponding to the maximum temperature previously reached, until the viscosity has stabilized. Normally, the total duration of the polymerization reaction will not exceed 8 hours.

During the reaction, vigorous stirring is maintained to insure homogeneous heating which is essential for the reaction to proceed satisfactorily.

The polymerization reaction mixture, at the end of the polymerization reaction, generally has a viscosity of 1,000 to 6,000 poises, when diluted, if necessary, to a concentration of 10 to 14 weight percent polymer content. The inherent viscosity of the polymeric product is greater than 0.5. The polymer can be separated from the polymerization solvent by conventional means, for instance, by precipitation, and can then be redissolved in concentrated sulfuric acid, or other solvent, if desired, for subsequent spinning operation.

Alternatively, the polymer may be spun directly from the polymerization reaction mixture, diluted, if desired, with additional quantities of polymerization solvent. The polymer may be wet or dry spun, or filmed, using various known procedures. Preferably, however, the polymer is wet spun, suitably through a spinneret into an aqueous coagulating bath containing 20 – 80% by weight of solvent, such as the polymerization solvent. The resulting filaments can then be subjected to stretching at a rate of between 1.2 and 2X, either in air or in a liquid, such as boiling water, or a mixture of water and solvent. The filament is then preferably washed in water, normally using countercurrent washing techniques, and then drained and dried. The filament can then be subjected to a thermal treatment under a low tension, for instance, between 0.8 and 1.2 g/tex. The thermal treatment is conveniently accomplished in an oven, having a temperature in the range of 300° – 400°C. If desired, the filament can then be subjected to a slight additional stretching, on the order of 1 – 1.5X at elevated temperatures, for instance, in the order of 300° – 400°C.

The resulting filaments, fibers and films of the polymers produced by the process of the present invention can be used in industrial applications requiring the characteristics of mechanical resistance and resistance to fatigue and high temperatures. Such applications include tire cords, conveyors, belts and the like.

EXAMPLES OF THE INVENTION

The invention will be understood more readily by reference to the following examples; however, these examples are intended to illustrate the invention and are not to be construed to limit the scope of the invention.

In the following examples, the solution viscosity was measured at 25°C on an Epprecht-Rheomat 15 apparatus. The inherent viscosity was measured at 25°C on a solution of 0.5 g of polymer in 100 cm³ of solvent, with the solvent being either N-methyl pyrrolidone or concentrated sulphuric acid (1.83 density).

EXAMPLE 1

400 g of paraphenylene diisocyanate (2.5 moles) and 225 g of anhydrous oxalic acid (2.5 moles) were dissolved in 2.5 kg of anhydrous N-methyl pyrrolidone and the resulting solution was introduced into a polymerization reactor. The reactor contents were maintained at room temperature for 1 hour, under agitation, during which time the mixture became more opaque and strong evolution of $CO_2$ and CO occurred, while the temperature rose to between 30 and 40°C. Thereafter, the reactor contents were heated, with the temperature of the reactor contents increasing at the rate of 1°C per minute. When the reactor contents were at 85°C, 97 g of lithium chloride were added, and heating was continued until the temperature of the reactor contents was 140°C. The solution was maintained at 140°C until the solution viscosity, which was determined at regular intervals, stabilized with no further changes. This viscosity stabilization was achieved at the end of 3 hours at 140°C. The solution had a viscosity of 1500 poises, after dilution of a concentration of 11% by weight of polymer, based on 100 grams of the solution. The inherent viscosity of the polymer, measured in concentrated sulphuric acid, was 0.9.

The solution obtained from the polymerization reactor was formed into fibers. The solution was extruded at a temperature of 24°C through a spinneret having 64 apertures, each of 0.05 mm in diameter, into a coagulating bath containing 55% by weight of N-methyl pyrrolidone and 45% by weight of water and maintained at 20°C. The resulting fibers were then passed, in ambient air, over a first roller turning at a peripheral speed of 13 meters per minute, and then over a second roller turning at a peripheral speed of 20 meters per minute, which produced a stretching of the filament of 1.54X. The filaments were then washed in water and dried at 120°C. The dried filaments were then subjected to a heating step under a tension of 1 g/tex for 1 minute in an oven at 325°C. Finally, the filament was subjected to a stretching of 1.2X by passing at a speed of 5 meters per minute through a tube 2 meters in length and 15 mm in diameter, heated at 325°C.

The resulting filament exhibited the following characteristics, measured on single filaments:

| | |
|---|---|
| Tensile strength | 38.4 g/tex |
| Extension at rupture | 2.3 % |
| Modulus of Elasticity | 2508 g/tex |

EXAMPLE 2

The solution of the polymer obtained from the polymerization reactor in Example 1 was extruded at 24°C through the same spinneret as used in Example 1, into a coagulating bath containing 60% by weight of N-methyl pyrrolidone and 40% by weight of water and maintained at 20°C. The resulting filaments were then subjected to a stretching operation in ambient air at a rate of 1.4X. The stretched filaments were then washed in water and dried, and then subjected to a heat treatment under a tension of 1 g/tex for 1 minute in an oven at 375°C. The filament was then stretched at a rate of 1.20X in the same tube as used in Example 1, but heated to 350°C.

The resulting filaments had the following characteristics, measured on single filaments:

| | |
|---|---|
| Tensile strength | 53.3 g/tex |
| Extension at rupture | 2.9 % |
| Modulus of elasticity | 2340 g/tex |

EXAMPLE 3

The polymer solution obtained from the polymerization reactor in Example 1 was extruded through the same spinneret and into the same coagulating bath as in Example 2. Then the filament was stretched at a rate of 1.33X in a bath maintained at 90°C and containing 63% by weight of N-methyl pyrrolidone and 37% by weight of water. Then the filaments were washed in water and dried at 120°C. Next the filaments were subjected to a heat treatment under a tension of 1.2 g/tex for 1 minute in an oven at 325°C. Finally, the filaments were stretched in the same tube as used in Example 1 at a rate of 1.29X and at a tube temperature of 325°C.

The resulting filaments exhibited the following characteristics, measured on single filaments:

| | |
|---|---|
| Tensile strength | 36.9 g/tex |
| Extension at rupture | 1.9 % |
| Modulus of elasticity | 2804 g/tex |

EXAMPLE 4

Example 3 was repeated, except the last stretching operation (in the tube) was modified. The filaments were stretched at the rate of 1.29X at a temperature of 350°C.

The resulting filaments had the following characteristics measured on single filaments:

| | |
|---|---|
| Tensile strength | 54.7 g/tex |
| Extension at rupture | 2.94 % |
| Modulus of elasticity | 2584 g/tex |

EXAMPLE 5

The arylalkyl polymer solution obtained from the polymerization reactor in Example 1 was extruded at a temperature of 24°C through a spinneret having 64 apertures, each 0.08 mm in diameter, into a coagulating bath maintained at 20°C and containing 55% by weight of N-methyl pyrrolidone and 45% by weight of water. The filament was then stretched in ambient air at a rate of 1.33X over a pair of rollers, washed in water and then dried at 120°C. The filaments were then stretched at a rate of 1.39X and at a temperature of 350°C in the same tube as used in Example 1.

The resulting filaments exhibited the following characteristics, measured on single filaments:

| | |
|---|---|
| Tensile strength | 40.6 g/tex |
| Extension at rupture | 2.66 % |
| Modulus of elasticity | 2265 g/tex |

EXAMPLE 6

The arylalkyl polymer solution obtained from the polymerization reactor in Example 1 was extruded through the same spinneret as used in Example 1 at a temperature of 24°C into a coagulating bath containing 60% by weight of N-methyl pyrrolidone and 40% by weight of water and maintained at a temperature of 50°C. The gelled polymeric filaments obtained were then stretched in boiling water at a rate of 1.47X. The stretched filaments were then washed in water and dried at 120°C. The dried filaments were then treated under a tension of 1 g/tex in an oven at 375°C for one minute.

The resulting filaments had the following characteristics, measured on single filaments:

| | |
|---|---|
| Tensile strength | 26.1 g/tex |
| Extension at rupture | 1.5 % |
| Modulus of elasticity | 2069 g/tex |

EXAMPLE 7

Example 1 was repeated except the filament was under a tension of 1.2 g/tex in the heat treatment at 325°C. Thereafter, the filaments were stretched in the same 2-meter tube as used in Example 1, with the tube heated to 350°C, and the stretching at a rate of 1.2X.

The resulting filaments exhibited the following characteristics, measured on single filaments:

| | |
|---|---|
| Tensile strength | 53.9 g/tex |
| Extension at rupture | 2.9 % |
| Modulus of elasticity | 2480 g/tex |

EXAMPLE 8

32 g of paraphenylene diisocyanate (0.2 moles) and 18 g of anhydrous oxalic acid (0.2 moles) were dissolved in 100 g of anhydrous N-methyl pyrolidone in a polymerization reactor. The reactor contents were maintained at room temperature and atmospheric pressure for the first hour, whereupon the mixture, under constant aggitation, became more opaque and a strong evolution of $CO_2$ and CO occurred, with the temperature rising between 40° and 45°C at the end of the hour. Thereafter, the reactor was heated, with the temperature of the reactor contents increasing at the rate of 1°C per minute. 3.5 g of lithium chloride were added to the reactor contents when the temperature of the contents was 85°C. Heating was continued, at the aforesaid temperature rise rate, until a temperature of 140°C was reached, and the reactor contents were then maintained at that temperature until the viscosity stabilized, as determined by regular interval sampling. The viscosity stabilization was reached at the end of 3 hours.

The polymerization solution, diluted to a polymer concentration of 10% by weight, expressed in terms of polymer weight per 100 g of solution, had a viscosity of 1200 poises. The inherent viscosity of the aryl alkyl polymer, measured in a concentrated sulphuric acid solution, was 0.9.

The diluted solution (having a polymer concentration of 10%) was then wet spun at a rate of 4.1 ml per minute, at a temperature of 25°C. The spinneret had 64 apertures, each of a diameter of 0.08 mm. The extruded filaments were passed to a coagulating bath maintained at 25°C and formed of a mixture of 50% by weight of N-methyl pyrrolidone and 50% by weight of water. The gelled polymeric polymeric filaments were then passed in ambient air over a set of rollers, the first roller having a peripheral speed of 13 meters per minute and the second roller having a peripheral speed of 18 meters per minute, resulting in a stretching of the filament at the rate of 1.4X. The stretched filament was washed in water on rollers, and the resulting filament exhibited the following properties:

| | |
|---|---|
| Tensile strength | 25 g/tex |
| Extension at rupture | 15 % |
| Modulus of elasticity | 600 g/tex |

The filaments were then passed through an electrically heated oven under a tension of 1 g/tex, with the oven, wherein the filaments were carried in air, being at a temperature of 300°C. The filaments were in the oven for one minute.

The resulting filaments had the following characteristics measured on single filaments:

| | |
|---|---|
| Tensile strength | 35 g/tex |
| Extension at rupture | 3 – 4 % |
| Modulus of elasticity | 4200 g/tex |

COMPARATIVE EXAMPLE A

This comparative example relates to the production of a filament of a polymer produced by reacting $\alpha,\alpha'$-diisocyanatodiphenylmethane and oxalic acid.

50 g of $\alpha,\alpha'$-diisocyanatodiphenylmethane (0.2 moles) and 18 g of anhydrous oxalic acid (0.2 moles) were dissolved in 130 cm$^3$ of N-methyl pyrrolidone in a polymerization reactor. The concentration of monomers in the reaction mixture was 34.3% by weight. The monomers were dissolved at ambient temperature under agitation with a strong evolution of $CO_2$ and CO noted, and a temperature rise to 40°C was observed. The polymerization reactor was then immersed in a heating oil bath, wherein the reactor contents reached a temperature of 100°C in 1 hour. At this stage of the reaction, the reaction mixture was becoming pasty, and 6.4 g of lithiumchloride were added, causing a decrease in the polymer viscosity, and allowing for increased polymerization temperatures to be used. The polymerization temperature was increased until a temperature of 145°C was reached at the end of 2½ hours.

The resulting highly viscous solution was diluted with N-methyl pyrrolidone to a concentration of 20% by weight based on the weight of polymer in relation to the total weight of the solution. The viscosity of the 20% by weight solution was 2000 poises and the inherent viscosity of the polymer, measured in solution in N-methyl pyrrolidone, was 0.9.

The polymer was spun using the procedure of Example 8, producing, after washing in water, filaments having the following properties, measured on single filaments:

| | |
|---|---|
| Tensile strength | 12 g/tex |
| Extension at rupture | 16 % |
| Modulus of elasticity | 380 g/tex |

The filaments were subjected to further treatment, as described in Example 8, except the oven was at a temperature of 325°C. The resulting filaments had the following characteristics, measured on single filaments:

| | |
|---|---|
| Tensile strength | 16 g/tex |
| Extension at rupture | 6 % |
| Modulus of elasticity | 450 g/tex |

A comparison of Example 8 and Comparative Example A indicates that the tensile strength and modulus of elasticity of the polymer based upon oxalic acid and paraphenylene diisocyanate are substantially higher than the corresponding values for the polymer based upon oxalic acid and $\alpha,\alpha'$-diisocyanate diphenylmethane.

EXAMPLE 9

Paraphenylene diisocyanate and oxalic acid were polymerized in N-methyl pyrrolidone by the procedure of Example 8, with 6.9 g of lithium chloride added when the polymerizing mixture reached a temperature of 85°C.

The polymerization solution was diluted to a polymer concentration of 12% by weight, in relation to the weight of the total solution, and the diluted solution had a viscosity of 1,400 poises. The inherent viscosity of the polymer, measured in solution of concentrated sulphuric acid, was 0.8.

The diluted solution was wet spun at a temperature of 25°C through a spinneret having 64 apertures, each of 0.08 mm in diameter, at a yield of 4.1 ml per minute into a coagulating bath of 60% by weight of N-methyl pyrrolidone and 40% by weight of water at a temperature of 30°C.

The gelled polymer filaments from the bath were stretched in air at the rate of 1.2X and then washed on rollers in water. The resulting filaments exhibited the following properties measured on single filaments:

| | |
|---|---|
| Tensile strength | 25 g/tex |
| Extension at rupture | 16 % |
| Modulus of elasticity | 550 g/tex |

The filaments were subsequently passed through an oven for 30 seconds at 375°C under a tension of 0.6 g/tex. The resulting filaments had the following characteristics, measured on single filaments:

| | |
|---|---|
| Tensile strength | 30 g/tex |
| Extension at rupture | 14 % |
| Modulus of elasticity | 3900 g/tex |

What is claimed is:

1. A process for the preparation of a high molecular weight film- and fiber-forming nitrogen-containing polymer, said process comprising reacting, in substantially stoichiometric amounts, oxalic acid and paraphenylene diisocyanate in a polar, aprotic, anhydrous, organic solvent at a temperature which is raised progressively at a rate of from about 1° to about 5°C per minute from a lower temperature of about 0° to about 30°C to a higher temperature of about 80°C to about 150°C, and in the presence, at least when the viscosity of the reaction mixture exceeds 6,000 poises, of a viscosity-reducing amount of a hydrogen bond breaking agent selected from the group consisting of lithium chloride and calcium chloride.

2. Process according to claim 1, wherein the concentration of the reagents in the solvent is about 10 to about 50 percent by weight in terms of ultimate polymer weight in grams per 100 grams of solution.

3. A process according to claim 1, wherein the viscosity of the reaction mixture when the polymerization is complete is about 1,000 to about 6,000 poises.

4. Process according to claim 2 wherein said concentration is 15 – 35 percent by weight.

5. Process as claimed in claim 1, wherein about 18 to about 25 weight percent of said hydrogen bond breaking agent is used, based on the weight of polymer produced.

6. Process according to claim 1 wherein said solvent is a linear or cyclic amide or phosphoramide or sulphone.

7. Process according to claim 1, wherein said temperature rise rate is 1° – 2°C.

8. Process according to claim 1, wherein the reaction temperature is raised to about 80 to about 120°C, at which point said lithium chloride or calcium chloride is added, and thereafter the temperature is raised to about 140° – 150°C.

9. Process according to claim 8, wherein the reaction temperature is maintained at about 140° to about 150°C until the viscosity of the reaction mixture stabilizes.

10. Process according to claim 9, wherein the overall reaction time is about 2 to about 8 hours.

11. Process as claimed in claim 1, wherein the polymer has an inherent viscosity, measured at 25°C on a solution of 0.5g of polymer in 100cm$^3$ of concentrated sulphuric acid, having a density of 1.83, of about 0.9.

* * * * *